US012703010B2

(12) United States Patent
Oh

(10) Patent No.: US 12,703,010 B2
(45) Date of Patent: Aug. 11, 2026

(54) APPARATUS FOR SORTING ABNORMAL BATTERY CELL

(71) Applicant: SAMSUNG SDI CO., LTD., Yongin-si (KR)

(72) Inventor: Seotaek Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 19/077,337

(22) Filed: Mar. 12, 2025

(65) Prior Publication Data

US 2025/0345827 A1 Nov. 13, 2025

(30) Foreign Application Priority Data

May 10, 2024 (KR) ........................ 10-2024-0062166

(51) Int. Cl.
*B07C 5/36* (2006.01)
*B07C 5/10* (2006.01)

(52) U.S. Cl.
CPC ................ *B07C 5/362* (2013.01); *B07C 5/10* (2013.01)

(58) Field of Classification Search
CPC .................................. B07C 5/10; B07C 5/362
USPC .......................................................... 209/509
See application file for complete search history.

(56) References Cited

U.S. PATENT DOCUMENTS

| | | | |
|---|---|---|---|
| 3,625,357 A | 12/1971 | Ochs et al. | |
| 2017/0326596 A1 | 11/2017 | Leane et al. | |
| 2023/0006273 A1 * | 1/2023 | Kim | H01M 10/441 |

FOREIGN PATENT DOCUMENTS

| | | | | |
|---|---|---|---|---|
| CN | 203534562 U * | 4/2014 | | |
| CN | 105689272 A | 6/2016 | | |
| CN | 214898334 U * | 11/2021 | | |
| CN | 116908715 A * | 10/2023 | G01R 31/3865 | |
| CN | 117920604 A | 4/2024 | | |
| EP | 4509851 A1 * | 2/2025 | H01M 10/4285 | |
| GB | 1276072 A | 6/1972 | | |
| KR | 20210081611 A * | 7/2021 | H01M 10/4285 | |
| KR | 102287763 B1 * | 8/2021 | H01M 10/4285 | |
| KR | 102639737 B1 * | 2/2024 | H01M 10/4285 | |
| WO | WO 2016-092079 A1 | 6/2016 | | |

OTHER PUBLICATIONS

Translation (Year: 2023).*
Extended European Search Report dated Sep. 22, 2025, of the corresponding European Patent Application No. 25175380.2.

* cited by examiner

*Primary Examiner* — Terrell H Matthews
(74) *Attorney, Agent, or Firm* — Lee IP Law, P.C.

(57) ABSTRACT

An apparatus for sorting an abnormal battery cell includes a transfer device including a moveable transfer path, battery cells being transferred along the moveable transfer path, a sorting jig on the transfer device, the sorting jig including an insertion portion facing the moveable transfer path of the transfer device, and the insertion portion having a shape and a size equal to an outer shape and a size of a predetermined battery cell, and an alarm on the transfer device, the alarm being configured to notify if the abnormal battery cell among the battery cells has a shape or a size larger than the outer shape and the size of the predetermined battery cell.

16 Claims, 5 Drawing Sheets

APPARATUS FOR SORTING ABNORMAL BATTERY CELL

CROSS-REFERENCE TO RELATED APPLICATION

This application claims priority to and the benefit of Korean Patent Application No. 10-2024-0062166, filed in the Korean Intellectual Property Office on May 10, 2024, the entire contents of which are incorporated herein by reference.

BACKGROUND

1. Field

The present disclosure relates to an apparatus for sorting an abnormal battery cell that may easily sort a battery cell that is abnormally large.

2. Description of the Related Art

Generally, a rechargeable battery is a battery that may be charged and discharged, unlike a primary battery that may not be recharged. The rechargeable battery may be used as an energy source such as mobile devices, electric vehicles, hybrid vehicles, electric bicycles, uninterruptible power supplies, and the like, and may be used as a single battery or a module in which a plurality of rechargeable batteries are connected to be grouped into one unit depending on the type of applied external device.

SUMMARY

An embodiment provides an apparatus for sorting an abnormal battery cell including a transfer device in which a plurality of battery cells are transferred along a transfer path; a sorting jig in which an insertion portion is formed through which the battery cells transferred by the transfer device are inserted and passed, wherein the insertion portion has an outer shape of the battery cell of a normal size; and an alarm that notifies a state in which an abnormal battery cell among the plurality of battery cells is not inserted into the insertion portion of the sorting jig.

A guide portion that guides the plurality of battery cells to be inserted into the insertion portion may be installed in the transfer device.

The guide portion may include a first guide protrusion that is installed at one edge of the transfer path of the transfer device and in which a first inclined surface that guides the battery cell to move to the insertion portion is formed on a side surface thereof; and a second guide protrusion that is installed at the other edge of the transfer path of the transfer device and in which a first inclined surface that guides the battery cell to move to the insertion portion is formed on a side surface facing the first inclined surface.

The apparatus for sorting the abnormal battery cell may further include a detection sensor that senses a state in which the battery cell of the abnormal size is not inserted into the insertion portion of the sorting jig.

The alarm may include an alarm portion that receives a sensing signal from the detection sensor to notify an operator.

The alarm portion may be an alarm display that receives a signal from the detection sensor to visually alert an operator.

The alarm portion may be an alarm speaker that receives a signal from the detection sensor to audibly alert an operator.

The transfer device may further include a remover that removes an abnormal battery cell sorted by the sorting jig to the outside of the transfer device.

The remover may include a cylinder member installed on a side surface of the transfer device at an installation position of the sorting jig to operate by receiving a sensing signal from the detection sensor; and a pressure plate coupled to a rod of the cylinder member to press an abnormal battery cell.

The sorting jig may include a jig body installed on the transfer path of the transfer device and having the insertion portion formed therein; and a clamping member that fixes the jig body to the transfer device.

The transfer device may be a conveyor on which the plurality of battery cells are moved in a direction of the sorting jig.

The apparatus for sorting the abnormal battery cell may further include a marker that marks the abnormal battery cell for identification when the abnormal battery cell is sensed by the detection sensor.

The marker may include a driving portion that receives a sensing signal of an abnormal battery cell from the detection sensor and provides a driving force; and a marking plate that moves forward and backward by the driving force of the driving portion to contact and mark a surface of the abnormal battery cell.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
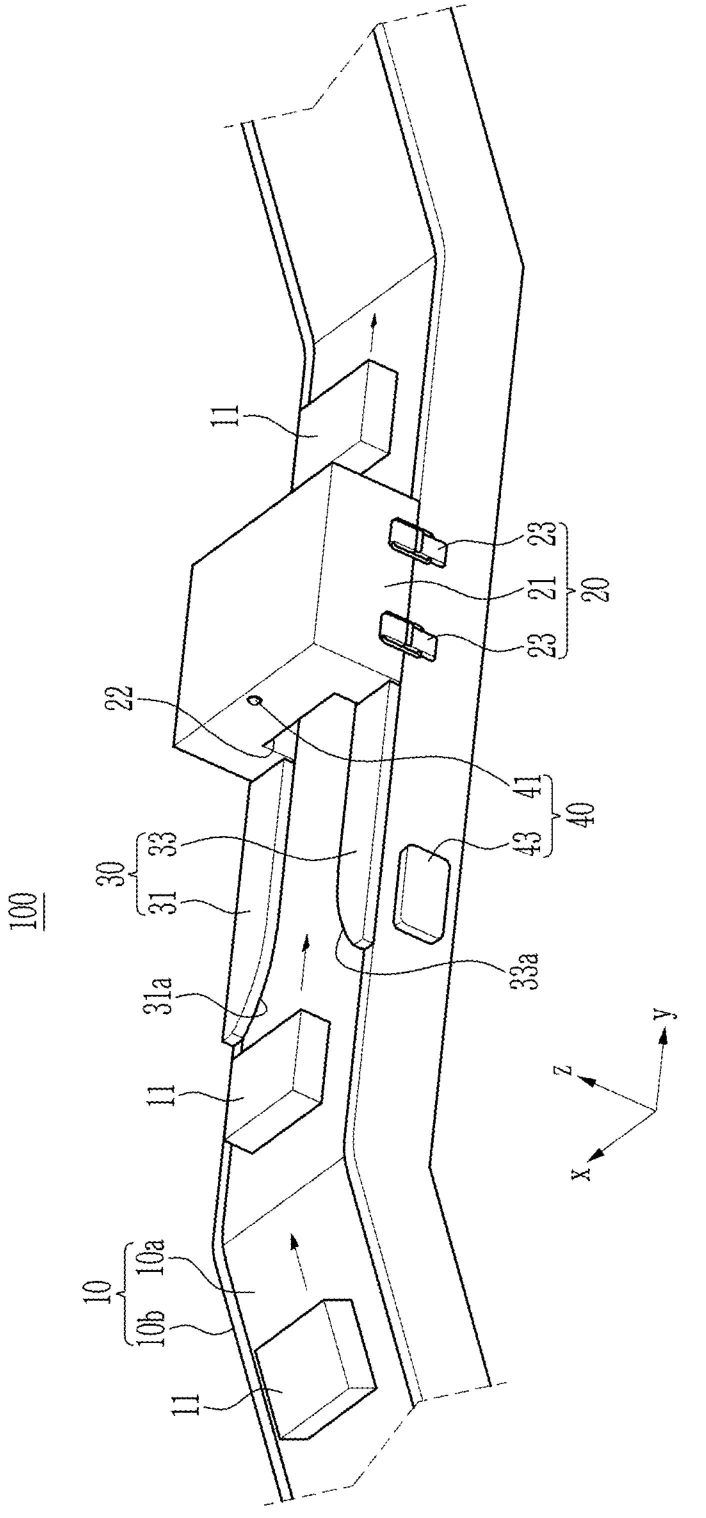
FIG. 1 schematically illustrates a partial perspective view of an apparatus for selecting an abnormal battery cell installed in a transfer device, according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 schematically illustrates a partial perspective view of a state in which an apparatus for selecting an abnormal battery cell according to an embodiment of the present disclosure is installed in a transfer device.

As shown in FIG. 1, an apparatus 100 (i.e., an apparatus for sorting an abnormal battery cell) according to an embodiment of the present disclosure is an apparatus for checking whether a battery cell 11 is manufactured to a set size (e.g., a predetermined size). The apparatus for sorting an abnormal battery cell may include a transfer device 10 (e.g., a transferrer) in which a plurality of battery cells 11 are transferred along a transfer path, a sorting jig 20 with an insertion portion 22 accommodating insertion of the battery cell 11 transferred from the transfer device 10 (e.g., the insertion portion 22 may be opened to have an external shape of the battery cell 11), and an alarm 40 indicating a state in which the battery cell 11 is not inserted into the sorting jig 20.

The transfer device 10 may be installed to transfer a plurality of pouch cell type battery cells 11, which require confirmation of whether they are in normal manufacturing condition, in a direction of (e.g., oriented toward) the sorting jig 20. For example, the transfer device 10 may be any suitable device capable of sequentially transferring a plurality of battery cells 11 in one (e.g., same) direction according to the present embodiment. For example, the transfer device 10 may be a conveyor system (e.g., a conveyor) including a continuously movable transfer path 10*a* (e.g., a moveable belt) that sequentially transfers (e.g., transports) a plurality of battery cells 11 from one place to another along the movement direction of the belt (e.g., in one direction). The transfer device 10 may be installed to sequentially transfer the plurality of battery cells 11 to inject them into the sorting jig 20.

The insertion portion 22 into which the battery cell 11 transferred by the transfer device 10 is inserted may be formed in the sorting jig 20. The insertion portion 22 may be opened in a direction of a transfer path formed in the transfer device 10, so that the battery cell 11 of a normal size may be inserted therein. In other words, the insertion portion 22 may be formed to penetrate the inside of the sorting jig 20 with a size and shape corresponding to (e.g., equal to) a size and a shape of an outer shape of the pouch cell type battery cell 11, and it may be formed so that a normal-sized battery cell 11 may be inserted into the inside of the sorting jig 20 by the transfer driving force of the transfer device 10.

As described above, the insertion portion 22 may be formed in the sorting jig 20, so that the battery cells 11 manufactured to a normal size by the normal manufacturing method may be selectively inserted through the insertion portion 22 into the sorting jig 20, and battery cells 11 manufactured to an abnormal size may not be inserted into the insertion portion 22 due to interference, thereby appropriately sorting the abnormal battery cells 11. This will be described in more detail below.

In detail, the sorting jig 20 may include a jig body 21 installed on the transfer path of the transfer device 10 and having the insertion portion 22 formed therein. For example, the jig body 21 may be a volumetric container with an empty space therein, and may include the insertion portion 22 through one sidewall thereof. For example, the jig body 21 may have a hexagonal shape having five sidewalls, one open side (e.g., an open bottom), and the insertion portion 22 in one of the five sidewalls. For example, the insertion portion 22 may be an opening through one of the five sidewalls of the jig body 21, and may face the battery cells 11 on the transfer device 10 approaching (e.g., moving toward) the sorting jig 20.

In addition, the sorting jig 20 may include a clamping member 23 that fixes (e.g., connects) the jig body 21 to the transfer device 10. The jig body 21 may be fixed by the clamping member 23 while being installed on the transfer path (e.g., a belt) of the transfer device 10, and it may be formed so that the insertion portion 22 may be opened in the transfer path direction. For example, referring to FIG. 1, the jig body 21 may be fixed by the clamping member 23 to a side frame 10*b* of the transfer device 10, such that the belt of the transfer device 10 (e.g., the belt supported by the side frame and continuously moving with the battery cells 11) may move underneath the open bottom of the jig body 21. The jig body 21 may be installed on the transfer path of the transfer device 10 with the lower portion open (e.g., with the open bottom facing the transfer device 10), so the normally manufactured battery cell 11 may pass through (e.g., into) the jig body 21 without interference by the driving force of the transfer device 10. Meanwhile, the battery cell 11 that is manufactured abnormally larger than the normal size may interfere with the insertion portion 22 of the jig body 21 to be sorted without being inserted into the insertion portion 22. For example, battery cells 11 having a larger size than that of the insertion portion 22 may be prevented (e.g., hindered or stopped) from entering the jig body 21 through the insertion portion 22 due to their larger size.

The clamping member 23 may be installed on the side surface of the jig body 21 to detachably fix the jig body 21 to the transfer device 10 such as a conveyor. For example, a plurality of clamping members 23 may be installed on both opposing sides of the jig body 21 to be latched onto the transfer device 10, so that they may be installed to detachably fix the jig body 21 to the transfer device 10. For example, the clamping member 23 may include a locking ring to be locked and fixed to the transfer device 10. In another example, the clamping member 23 may be a fastening member, e.g., a bolt member.

As shown in FIG. 1, a guide portion 30 may be installed in the transfer device 10 to guide the movement of the plurality of battery cells 11 in the direction of the sorting jig 20. That is, the guide portion 30 may be installed to guide the plurality of battery cells 11 transferred by the transfer device 10 to be stably inserted into the insertion portion 22 of the sorting jig 20.

In detail, the guide portion 30 may include a first guide protrusion 31 installed at a first edge of the transfer path of the transfer device 10 and a second guide protrusion 33 installed at a second edge of the transfer path of the transfer device 10. For example, referring to FIG. 1, the first and second guide protrusions 31 and 33 may be on opposite sides of the frame supporting the moving belt of the transfer device 10.

The first guide protrusion 31 may be installed to guide the battery cell 11, which is moved in a state biased toward one direction of the transfer path of the transfer device 10, in the direction of the insertion portion 22 of the central portion of the transfer path. A first inclined surface 31*a* may be formed on a side surface of the first guide protrusion 31, e.g., the first inclined surface 31*a* may be formed only at one side of the first guide protrusion 31 distal from the jig body 21. The first inclined surface 31*a* may be formed along a side surface of the first guide protrusion 31 in a longitudinal direction, and may be inclined with respect to an edge of the transfer device 10 in the direction of the insertion portion 22 to guide the battery cell 11 to move in the direction of the insertion portion 22.

The second guide protrusion 33 may be installed to guide the battery cell 11, which is moved in a state biased toward the other direction of the transfer path of the transfer device 10, in the direction of the insertion portion 22 of the central portion of the transfer path. In other words, the second guide protrusion 33 is installed in a protruded state at a position opposite to the first guide protrusion 31 installed on the transfer device 10, and may guide the battery cell 11 moved on the transfer device 10 between the first guide protrusion 31 and the second guide protrusion 33 to be moved to the correct position in the direction of the insertion portion 22.

The second guide protrusion 33 may be formed in the same or similar shape or size as the first guide protrusion 31. A second inclined surface 33*a* may be formed on a side surface of the second guide protrusion 33, e.g., the second inclined surface 33*a* may be formed only at one side of the second guide protrusion 33 distal from the jig body 21. The second inclined surface 33*a* may be formed along a side surface of the second guide protrusion 33 in a longitudinal direction, and may be inclined with respect to an edge of the transfer device 10 in the direction of the insertion portion 22 to guide the battery cell 11 to move in the direction of the insertion portion 22. As described above, the first and second guide protrusions 31 and 33 may be respectively installed on both edges of the transfer device 10 at the position at which the sorting jig 20 is installed, so that the stable movement of the plurality of battery cells 11 moving in the direction of the insertion portion 22 of the sorting jig 20 may be guided by the driving of the transfer device 10.

Meanwhile, if the battery cell 11 is not injected into the sorting jig 20, the alarm 40 may be activated. The alarm 40 may include a detection sensor 41 for checking the state in which the battery cell 11 is not injected into the insertion portion 22 of the sorting jig 20, and an alarm portion 43 for receiving a sensing signal from the detection sensor 41 and notifying the operator.

The detection sensor 41 may be installed in the transfer device 10 at a position close to the sorting jig 20, and may be installed to sense (e.g., to detect) a state in which the battery cell 11 is not inserted into the insertion portion 22 of the sorting jig 20 and to transmit the sensing signal to the alarm portion 43. For example, referring to FIG. 1, the detection sensor 41 may be on a same sidewall of the jig body 21 as the insertion portion 22 (e.g., the detection sensor 41 may be above the insertion portion 22 relative to the transfer device 10).

For example, the detection sensor 41 may be applied as a laser sensor in the present embodiment, and may be installed to sense the battery cell 11 that is not inserted into the insertion portion 22 of the sorting jig 20. In another example, the detection sensor 41 may be applied as a touch sensor. The sensing signal of the detection sensor 41 may be transmitted to the alarm portion 43 to perform an alarm operation.

The alarm portion 43 may be installed in the transfer device 10 so that an operator may easily check an abnormal sensing signal of the detection sensor 41. The alarm portion 43 may be applied as an alarm display that receives a signal from the detection sensor 41 in the present embodiment and visually alerts an operator.

The alarm portion 43 (e.g., the alarm display) may be installed so that the operator may check the sensing signal of the detection sensor 41, and may be installed so that the operator may easily check it visually. When receiving the abnormal state of the battery cell 11 from the detection sensor 41, the alarm portion 43 (e.g., the alarm display) may be installed to display a predetermined image notifying the operator of the abnormal state.

As described above, it is possible to sort a battery cell manufactured with an abnormal size (and/or shape) by the sorting jig 20 and to alert the operator in real time of the sorting operation state by the alarm portion 43, so that it is possible to easily identify the manufacturing defect state of the battery cell 11 and perform an appropriate sorting operation.

Figure 2:
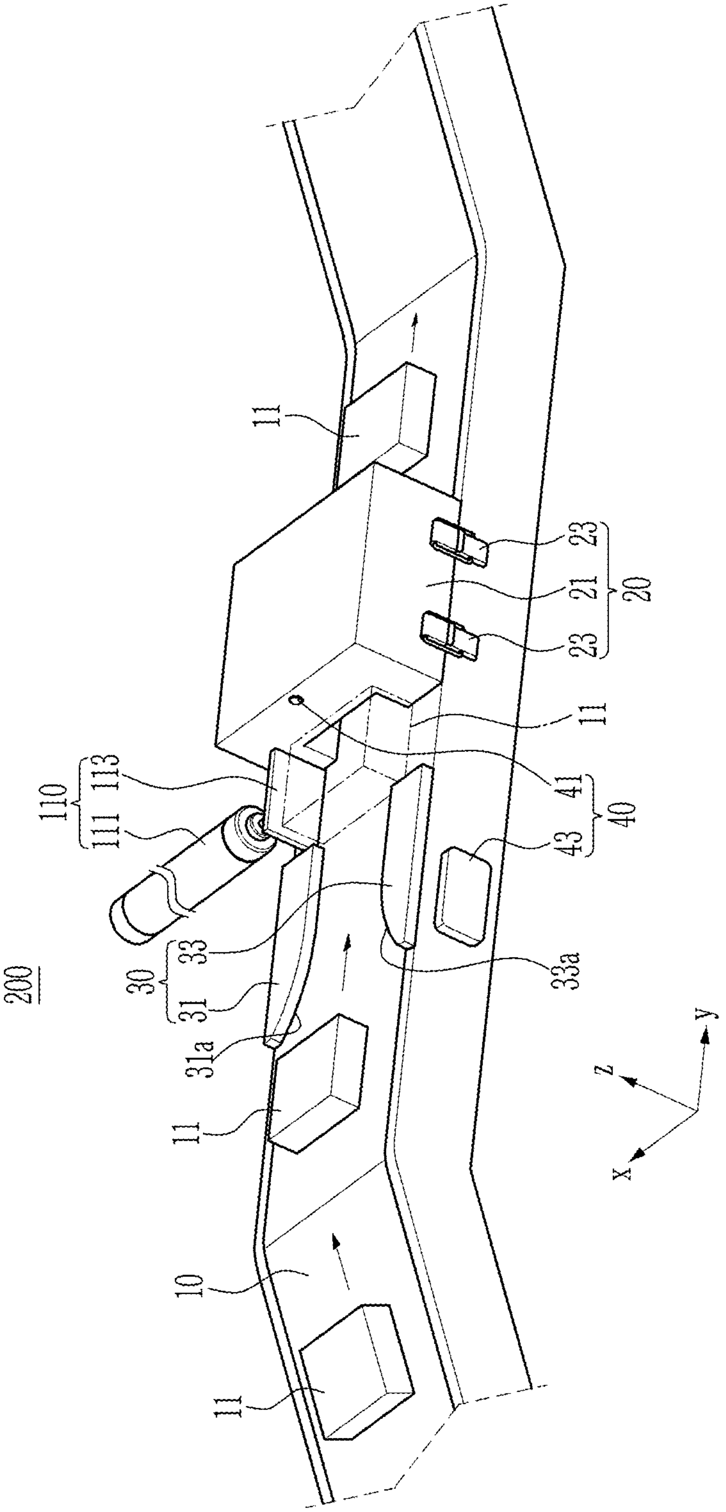
FIG. 2 schematically illustrates a partial perspective view of an apparatus for selecting an abnormal battery cell installed in a transfer device according to another embodiment of the present disclosure.
Figure 3:
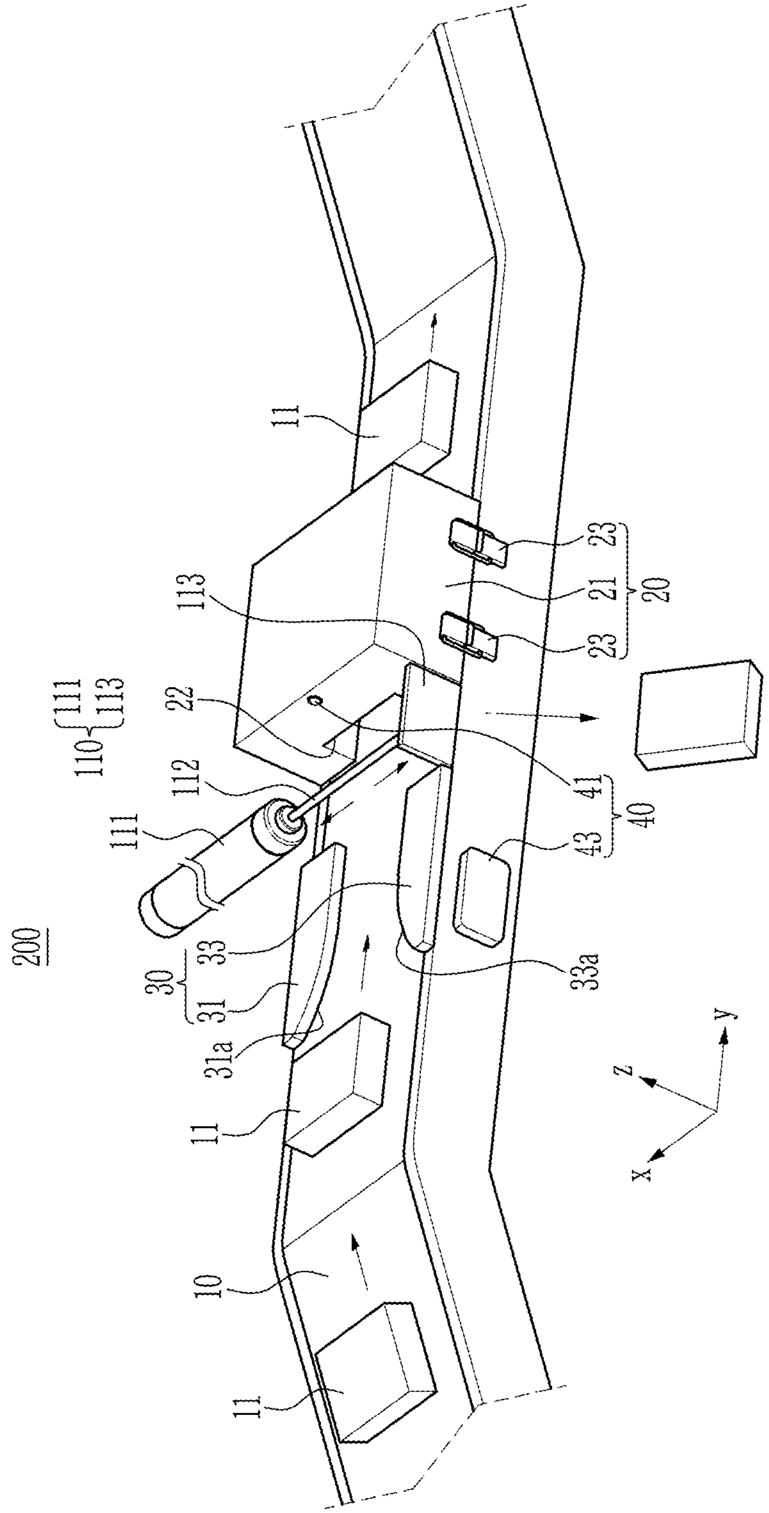
FIG. 3 schematically illustrates a partial perspective view of an abnormal battery cell removed from a transfer device by an operation of a remover of FIG. 2.

FIG. 2 schematically illustrates a partial perspective view of a state in which an apparatus for selecting an abnormal battery cell according to another embodiment of the present disclosure is installed in the transfer device 10, and FIG. 3 schematically illustrates a partial perspective view of a state in which an abnormal battery cell is removed from the transfer device 10 by an operation of a remover of FIG. 2.

As shown in FIG. 2 and FIG. 3, the transfer device 10 of an apparatus 200 (i.e., an apparatus for sorting an abnormal battery cell) according to another embodiment of the present disclosure may be installed with a remover 110 for removing an abnormal battery cell that is not inserted into the sorting jig 20. For example, the remover 110 may be adjacent to the sorting jig 20.

Referring to FIGS. 2 and 3, the remover 110 may include a cylinder member 111 installed on the side surface of the transfer device 10 at the installation position of the sorting jig 20, and a pressure plate 113 coupled to a rod 112 of the cylinder member 111 to press the abnormal battery cell. For example, referring to FIG. 2, the remover 110 may be between the guide portion 30 and the jig body 21 along a longitudinal direction of the transfer device 10, e.g., the pressure plate 113 may be positioned between the guide portion 30 and the jig body 21.

In detail, the cylinder member 111 may be installed on the side surface of the transfer device 10 at the position where the sorting jig 20 is installed, and the rod 112 may be moveable in and out of the cylinder member 111 (e.g., along the arrows in FIG. 3). For example, a longitudinal direction of the cylinder member 111 and the rod 112 may be perpendicular to the longitudinal direction of the transfer device 10 (e.g., perpendicular to the moving direction of the belt of the transfer device 10), so the rod 112 may be moveable out of the cylinder member 111 toward the insertion portion 22 of the sorting jig 20.

The pressure plate 113 may be connected to (e.g., installed on) the rod 112, so the rod 112 may be between the cylinder member 111 and the pressure plate 113. Accordingly, movement of the rod 112 may move the pressure plate 113, so extension of the rod 112 from the cylinder member 111 toward the insertion portion 22 may move the pressure plate 113 toward the insertion portion 22, such that the pressure plate 113 moving toward the insertion portion 22 may push a battery cell (indicated by a dashed line in FIG. 2) not inserted into the insertion portion 22 toward the outside (e.g., off) of the transfer device 10 by the operation of the rod 112 of the cylinder member 111.

Accordingly, an abnormal battery cell (i.e., a battery cell too large to be inserted through the insertion portion 22 of the sorting jig 20) that may be blocked (e.g., stopped) at the insertion portion 22, may be automatically removed to the outside of the transfer device 10, thereby improving the efficiency of the sorting operation of the battery cell 11. For example, operation of the remover 110 may be controlled by a controller in response to activation of the alarm 40.

Figure 4:
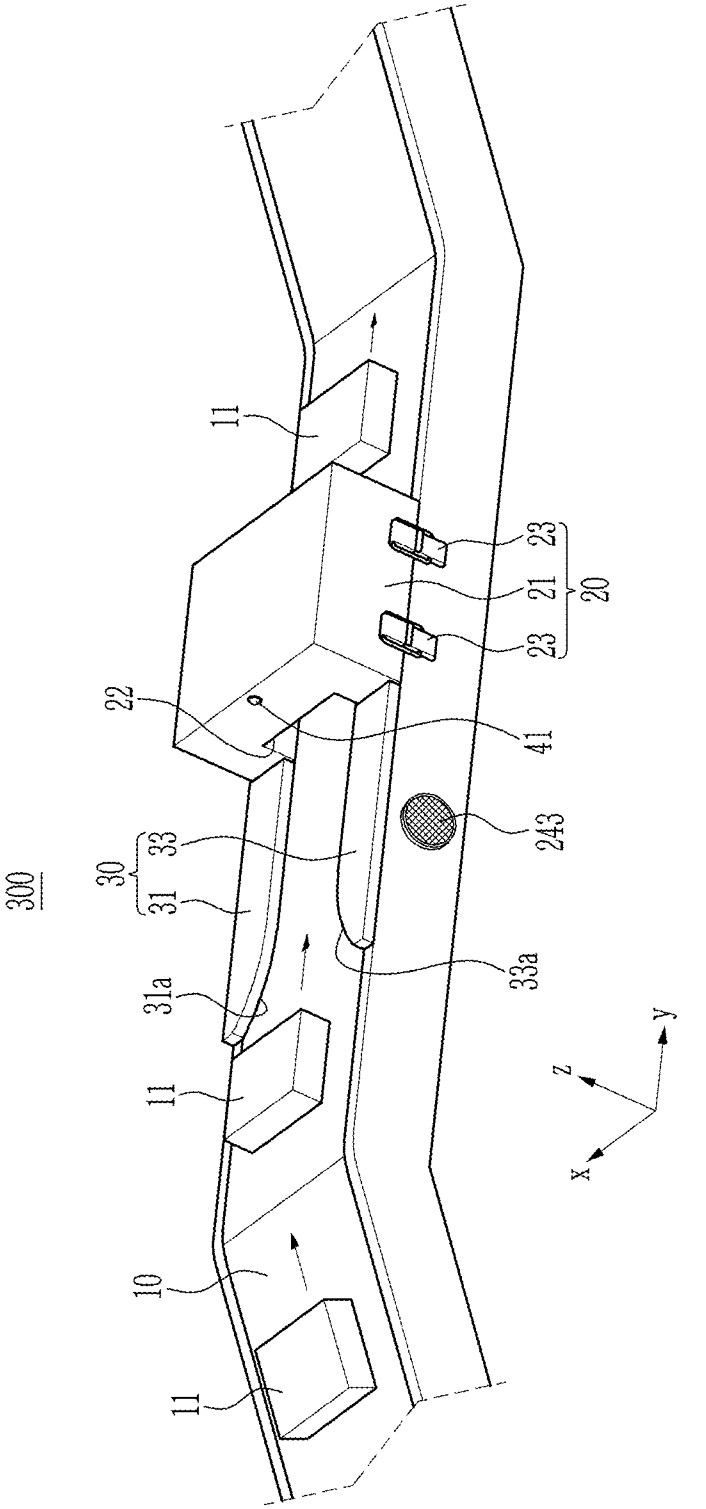
FIG. 4 schematically illustrates a partial perspective view of an apparatus for selecting an abnormal battery cell in a transfer device according to yet another embodiment of the present disclosure.

FIG. 4 schematically illustrates a partial perspective view of a state in which an apparatus for selecting an abnormal battery cell according to yet another embodiment of the present disclosure is installed in the transfer device 10.

As shown in FIG. 4, an alarm portion 243 of an apparatus 300 (i.e., an apparatus for sorting an abnormal battery cell) according to yet another embodiment of the present disclosure may be an alarm speaker that receives a signal from the detection sensor 41 and audibly alerts an operator. The alarm portion 243 (i.e., the alarm speaker) may be installed so that the operator may check the sensing signal of the detection sensor 41, and may be installed so that the operator may easily check it audibly. When receiving the abnormal state of the battery cell 11 from the detection sensor 41, the alarm portion 243 (i.e., the alarm speaker) may be installed to generate a predetermined warning sound notifying the operator of the abnormal state, e.g., so the operator may remove the abnormal battery cell stopped by the insertion portion 22 from the transfer device 10.

Figure 5:
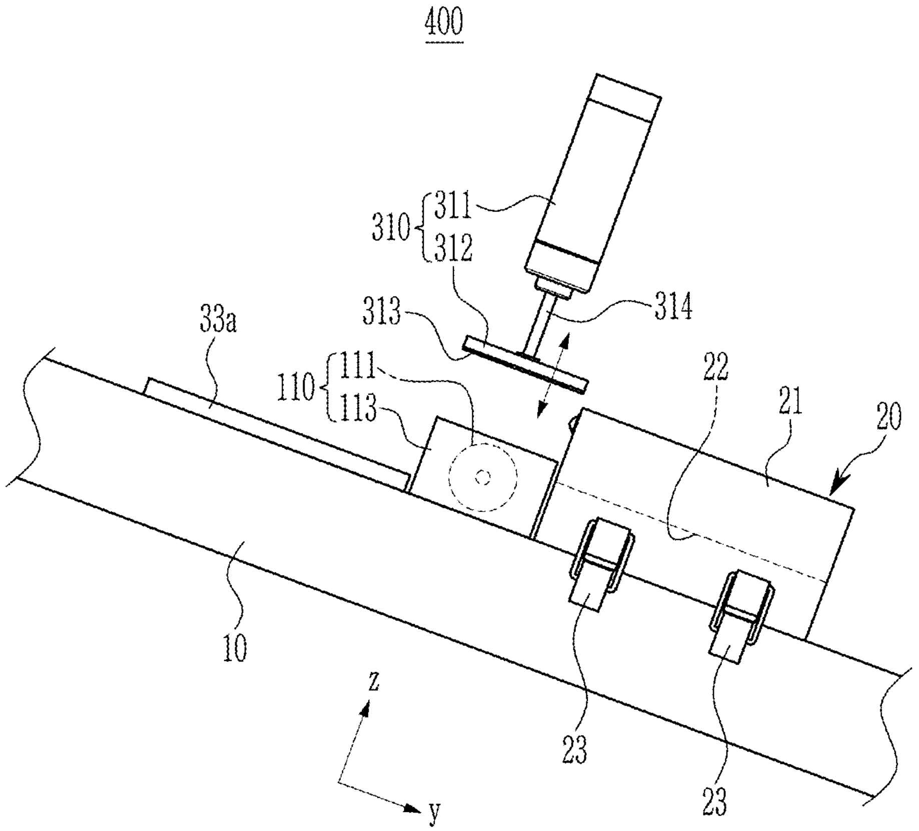
FIG. 5 schematically illustrates a partial side view of an apparatus for selecting an abnormal battery cell in a transfer device according to still another embodiment of the present disclosure.

FIG. 5 schematically illustrates a partial side view of a state in which an apparatus for selecting an abnormal battery cell according to still another embodiment of the present disclosure is installed in the transfer device 10.

As shown in FIG. 5, when the abnormal battery cell 11 is sensed by the detection sensor 41, a marker 310 that marks the abnormal battery cell 11 for identification may be installed in an apparatus 400 (i.e., an apparatus for sorting an abnormal battery cell) according to still another embodiment of the present disclosure. For example, referring to FIG. 5, the marker may be at a height above the sorting jig 20 relative to the transfer device 10.

The marker 310 may facilitate the sorting of the abnormal battery cell 11 by marking the surface of the abnormal battery cell 11 that is not inserted into the insertion portion 22 of the sorting jig 20. In detail, the marker 310 may include a driving portion 311 that receives a sensing signal of the abnormal battery cell 11 of the detection sensor 41 to provide a driving force, and a marking plate 312 that is moved back and forth by the driving force of the driving portion 311 to contact the surface of the abnormal battery cell 11 to make an identification mark.

The driving portion 311 may be installed at a side position of the transfer device 10 in which the sorting jig 20 is installed, and may be installed to provide forward and backward driving power to the marking plate 312 according to a sensing signal of the detection sensor 41. The driving portion 311 may be applied as a pneumatic or hydraulic cylinder. The marking plate 312 may be connected to a rod 314 of the driving portion 311, and may be moved toward the abnormal battery cell 11 by the operation of the rod 314 to be installed to mark the surface of the abnormal battery cell 11.

To this end, a marking portion 313 for marking may be attached to the surface of the marking plate 312. The marking portion 313 may be attached to the surface of the marking plate 312 to be applied as a stamp with an engraving of a predetermined shape so as to mark an image of a predetermined shape on the surface of the abnormal battery cell 11. Accordingly, since an image of a predetermined shape is marked on the surface of the abnormal battery cell 11 by the marking portion 313, it is possible for the operator to easily check the abnormal battery cell 11, so that it is possible to more easily sort the battery cell 11. The marking portion 313 is illustratively described as being applied as a stamp in the present embodiment, but may be changed and applied as an ink marking method or a sticker attachment method.

By way of summation and review, changes in the dimensions (e.g., thickness or width) of a battery cell occurring due to a manufacturing error during the manufacturing process of the rechargeable battery may trigger ignition, thereby requiring inspection of dimensions of the manufactured battery cells. While inspection of battery cells dimensions for determining defects may be performed by CT scanning or disassembly of the battery cell, disassembly of the battery cells may render battery cell use impossible and CT scanning may require expert knowledge and may be difficult to apply in actual processes.

In contrast, embodiments provide an apparatus for sorting an abnormal battery cell that includes a sorting jig that may easily sort and remove battery cells of abnormal size from being inserted therein. That is, according to the embodiment of the present disclosure, it is possible to sort abnormally sized battery cells from a transfer device using a sorting jig and alert the operator in real time about a state of a sorting operation, making it possible to easily identify manufacturing defects in battery cells and perform appropriate sorting work. According to the embodiment of the present disclosure, it is possible to automatically remove abnormal battery cells to the outside of the transfer device by a remover, thereby improving the efficiency of the battery cell sorting process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for sorting an abnormal battery cell, the apparatus comprising:
- a transfer device including a moveable transfer path, battery cells being transferred along the moveable transfer path;
- a sorting jig on the transfer device, the moveable transfer path of the transfer device being moveable through the sorting jig, the sorting jig including an insertion portion facing the moveable transfer path of the transfer device, and the insertion portion having a shape and a size equal to an outer shape and a size of a predetermined battery cell;
- an alarm on the transfer device, the alarm being configured to notify if the abnormal battery cell among the battery cells has a shape or a size larger than the outer shape and the size of the predetermined battery cell; and
- a marker configured to mark the abnormal battery cell in response to operation of the alarm.

2. The apparatus for sorting the abnormal battery cell of claim 1, further comprising a guide portion on the transfer device, the guide portion being configured to guide the battery cells along the moveable transfer path and to be inserted into the insertion portion.

3. The apparatus for sorting the abnormal battery cell of claim 2, wherein:

the transfer device includes a continuously moveable transfer path between two side frames, the sorting jig being attached to the two side frames, and the guide portion includes:

a first guide protrusion at one edge of the moveable transfer path of the transfer device and attached to one of the two side frames, the first guide protrusion including a first inclined surface on a side surface thereof and configured to guide the battery cells toward the insertion portion; and a second guide protrusion at another edge of the moveable transfer path of the transfer device and attached to another of the two side frames, the second guide protrusion including a second inclined surface on a side surface facing the first inclined surface and configured to guide the battery cells toward the insertion portion.

4. The apparatus for sorting the abnormal battery cell of claim 3, wherein the alarm includes a detection sensor on the sorting jig, the detection sensor being configured to sense a state in which the abnormal battery cell is detected and not inserted into the insertion portion of the sorting jig.

5. The apparatus for sorting the abnormal battery cell of claim 4, wherein the alarm further includes an alarm portion configured to receive a sensing signal from the detection sensor to notify an operator.

6. The apparatus for sorting the abnormal battery cell of claim 5, wherein the alarm portion is an alarm display configured to receive a signal from the detection sensor to visually alert an operator.

7. The apparatus for sorting the abnormal battery cell of claim 5, wherein the alarm portion is an alarm speaker configured to receive a signal from the detection sensor to audibly alert an operator.

8. The apparatus for sorting the abnormal battery cell of claim 1, further comprising a remover adjacent to the sorting jig, the remover including a pressure plate along the moveable transfer path and adjacent to the insertion portion, the pressure plate being configured to remove the abnormal battery cell from the transfer device.

9. The apparatus for sorting the abnormal battery cell of claim 8, wherein the remover includes:

a cylinder member on a side surface of the transfer device and adjacent to the sorting jig, the cylinder member including a moveable rod and being configured to receive a sensing signal from the alarm and to operate the moveable rod; and a pressure plate coupled to the moveable rod of the cylinder member, the pressure plate being configured to press the abnormal battery cell.

10. The apparatus for sorting the abnormal battery cell of claim 1, wherein the sorting jig includes:

a jig body on the transfer device, the jig body including the insertion portion; and a clamping member connecting the jig body to the transfer device.

11. The apparatus for sorting the abnormal battery cell of claim 1, wherein the transfer device is a conveyor, the moveable transfer path being a conveyor belt configured to move toward the sorting jig.

12. The apparatus for sorting the abnormal battery cell of claim 1, wherein the marker includes:

a driving portion configured to receive a sensing signal of the abnormal battery cell from the alarm and to provide a driving force; and a marking plate configured to move forward and backward by the driving force of the driving portion to contact and to mark a surface of the abnormal battery cell.

13. The apparatus for sorting the abnormal battery cell of claim 3, wherein the first guide protrusion and the second guide protrusion are on opposite sides of the insertion portion.

14. The apparatus for sorting the abnormal battery cell of claim 13, wherein each of the first guide protrusion and the second guide protrusion has a non-overlapping relationship with the insertion portion.

15. The apparatus for sorting the abnormal battery cell of claim 13, wherein:

each of the first and seconds guide protrusions is in contact with a surface of the sorting jig including the insertion portion, the first and second inclined surfaces of the first and second guide protrusions, respectively, face away from the sorting jig, and ends of the first and second guide protrusions facing and contacting the sorting jig are aligned with opposite edges of the insertion part of the sorting jig.

16. The apparatus for sorting the abnormal battery cell of claim 1, wherein the sorting jig includes:

a jig body attached to a supporting frame of the moveable transfer path of the transfer device, the jig body having five surfaces arranged into a volumetric container with an empty space therein, and a bottom of the jig body being open and overlapping the moveable transfer path of the transfer device; and the insertion portion in one of the five surfaces of the jig body, the insertion portion being oriented to face a movement direction of the moveable transfer path of the transfer device, and the moveable transfer path of the transfer device being configured to continuously move through the sorting jig.

* * * * *